United States Patent
Prause et al.

(10) Patent No.: US 11,951,698 B2
(45) Date of Patent: Apr. 9, 2024

(54) COMPOSITE CHARGE POSITIONING SYSTEM

(71) Applicant: The Boeing Company, Chicago, IL (US)

(72) Inventors: Richard Alexander Prause, Charleston, SC (US); Andrew Elmer Modin, Charleston, SC (US)

(73) Assignee: The Boeing Company, Chicago, IL (US)

( * ) Notice: Subject to any disclaimer, the term of this patent is extended or adjusted under 35 U.S.C. 154(b) by 360 days.

(21) Appl. No.: 17/303,825

(22) Filed: Jun. 8, 2021

(65) Prior Publication Data

US 2021/0291467 A1    Sep. 23, 2021

Related U.S. Application Data

(62) Division of application No. 16/213,987, filed on Dec. 7, 2018, now Pat. No. 11,046,032.

(51) Int. Cl.
*B29C 70/54* (2006.01)
*B29C 70/38* (2006.01)
*B29D 99/00* (2010.01)

(52) U.S. Cl.
CPC .......... *B29C 70/541* (2013.01); *B29C 70/386* (2013.01); *B29D 99/0003* (2013.01)

(58) Field of Classification Search
None
See application file for complete search history.

(56) References Cited

U.S. PATENT DOCUMENTS

| | | | |
|---|---|---|---|
| 5,114,654 A * | 5/1992 | Hosoi | B32B 1/00 425/389 |
| 7,879,177 B2 | 2/2011 | McCowin et al. | |
| 8,640,757 B2 | 2/2014 | McCowin et al. | |
| 9,782,937 B1 | 10/2017 | Modin et al. | |
| 2010/0170631 A1* | 7/2010 | Kim | B29C 70/44 156/212 |
| 2010/0193114 A1* | 8/2010 | Millar | B29C 70/543 156/441.5 |
| 2016/0121560 A1 | 5/2016 | Lee et al. | |
| 2016/0354982 A1 | 12/2016 | Prause et al. | |
| 2018/0001578 A1 | 1/2018 | Modin et al. | |
| 2018/0319050 A1 | 11/2018 | Prause et al. | |
| 2018/0319051 A1 | 11/2018 | Heath et al. | |

OTHER PUBLICATIONS

Peterson et al., "Method for Co-Curing Perpendicular Stiffeners," U.S. Appl. No. 16/010,905, filed Jun. 18, 2018, 43 pages.
Notice of Allowance dated Mar. 3, 2021 regarding U.S. Appl. No. 16/213,987; 8 pgs.
Office Action dated Dec. 15, 2020 regarding U.S. Appl. No. 16/213,987; 14 pgs.

* cited by examiner

*Primary Examiner* — Christopher T Schatz
(74) *Attorney, Agent, or Firm* — Yee & Associates, P.C.

(57) ABSTRACT

A method of positioning a composite charge onto a forming tool using a composite charge positioning assembly. The composite charge is placed onto a first surface of a first charge support arm of the composite charge positioning assembly and a second surface of a second charge support arm of the composite charge positioning assembly. The composite charge is placed in contact with a portion of a forming surface of the forming tool.

20 Claims, 12 Drawing Sheets

COMPOSITE CHARGE POSITIONING SYSTEM

CROSS-REFERENCE TO RELATED APPLICATION(S)

This application is a divisional of U.S. patent application Ser. No. 16/213,987, filed Dec. 7, 2018, the disclosure of which is incorporated by reference herein in its entirety.

BACKGROUND INFORMATION

1. Field

The present disclosure relates generally to positioning a composite charge onto a forming tool. More specifically, the present disclosure relates to alignment of an elongated net trimmed composite charge onto a forming tool.

2. Background

Composite materials are tough, light-weight materials created by combining two or more functional components, such as reinforcing fibers bound in polymer resin matrix. The fibers may be unidirectional or may take the form of a woven cloth or fabric.

In manufacturing composite structures, layers of composite material are typically laid up on a surface. The layers may be comprised of fibers in sheets. These sheets may take the form of fabrics, tape, tows, or other suitable forms. In some cases, resin may be infused or preimpregnated into the sheets. These types of sheets are commonly referred to as prepreg.

In composite manufacturing, composite layers may be laid up directly onto a tool or laid up on a different surface and then lifted and placed onto a tool. When composite layers are lifted and placed onto a tool, accuracy of placement is essential. Often, human operators are unable to achieve a desired accuracy for placement of composite layers.

Conventional automated "pick and place" systems for composite layers are large and expensive systems that are dedicated to picking and placing composite layers at a designated location on a manufacturing floor. Conventional "pick and place" systems are often undesirably expensive and time-consuming to install. Conventional "pick and place" systems may not be easily scalable to lift larger composite layers than the system was designed to handle.

Therefore, it would be desirable to have a method and apparatus that takes into account at least some of the issues discussed above, as well as other possible issues. For example, it would be desirable to have a composite charge positioning system that provides greater accuracy than a human operator but at a lower price than conventional "pick and place" systems. As another example, it would be desirable to have a composite charge positioning system that is at least one of moveable within a manufacturing environment or expandable to accommodate varying sizes of composite charges.

SUMMARY

An illustrative embodiment of the present disclosure provides a method of positioning a composite charge onto a forming tool using a composite charge positioning assembly. The composite charge is placed onto a first surface of a first charge support arm of the composite charge positioning assembly and a second surface of a second charge support arm of the composite charge positioning assembly. The composite charge is placed in contact with a portion of a forming surface of the forming tool.

Another illustrative embodiment of the present disclosure provides a method of positioning a composite charge onto a forming tool using a composite charge positioning assembly. A first charge support arm of the composite charge positioning assembly is positioned relative to a forming surface of the forming tool. A second charge support arm of the composite charge positioning assembly is positioned relative to the forming surface of the forming tool. The composite charge is placed onto a first surface of the first charge support arm of the composite charge positioning assembly and a second surface of the second charge support arm of the composite charge positioning assembly. The first charge support arm and the second charge support arm are lowered towards the forming tool to place the composite charge in contact with a portion of a forming surface of the forming tool.

Yet another illustrative embodiment of the present disclosure provides a method of positioning a composite charge onto a forming tool using a composite charge positioning assembly. The forming tool is moved to the composite charge positioning assembly. The forming tool is placed between a first charge support arm assembly and a second charge support arm assembly of the composite charge positioning assembly. The forming tool is locked between the first charge support arm assembly and the second charge support arm assembly. The composite charge is placed onto a first surface of a first charge support arm of the first charge support arm assembly and a second surface of a second charge support arm of the second charge support arm assembly. The composite charge is placed in contact with a portion of a forming surface of the forming tool.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that conventional pick and place systems require construction within the manufacturing environment. Assembling a conventional pick and place system may use at least one of an undesirable amount of time or an undesirable amount of space in the manufacturing environment. A conventional pick and place system may have an undesirably high investment cost. The illustrative embodiments recognize and take into account that it would be desirable to present a composite charge positioning system that does not change the infrastructure of the manufacturing environment.

The illustrative embodiments recognize and take into account that it would be desirable to present a composite charge positioning system that provides a desired accuracy with a smaller footprint than a pick and place system. The illustrative embodiments recognize and take into account that it would be desirable to present a composite charge positioning system that is at least one of less expensive or less time consuming to set-up than a conventional pick and place machine.

The illustrative embodiments recognize and take into account that composite parts may be co-cured together. When composite parts are cured prior to joining, the composite parts are trimmed to remove excess. When composite parts are co-cured, the composite parts are net trimmed such that the cured material has the desired shape without additional trimming. In some illustrative examples, separately cured composite parts are net trim parts that do not receive additional trimming after cure. The illustrative embodiments recognize and take into account that net trim composite parts may require a higher accuracy of placement onto forming tools than parts to receive an after-cure trim.

An illustrative embodiment presents a composite charge positioning system configured to position a composite charge onto a forming tool. The composite charge positioning system comprises a plurality of composite charge positioning assemblies positioned along a length of the composite charge positioning system, each composite charge positioning assembly of the plurality of composite charge positioning assemblies comprising a base; a first charge support arm associated with the base and movable in a first direction towards or away from the base, the first charge support arm having a first surface configured to contact a portion of a composite charge; and a second charge support arm associated with the base and movable in the first direction, and the second charge support arm having a second surface configured to contact a second portion of the composite charge.

Figure 1:
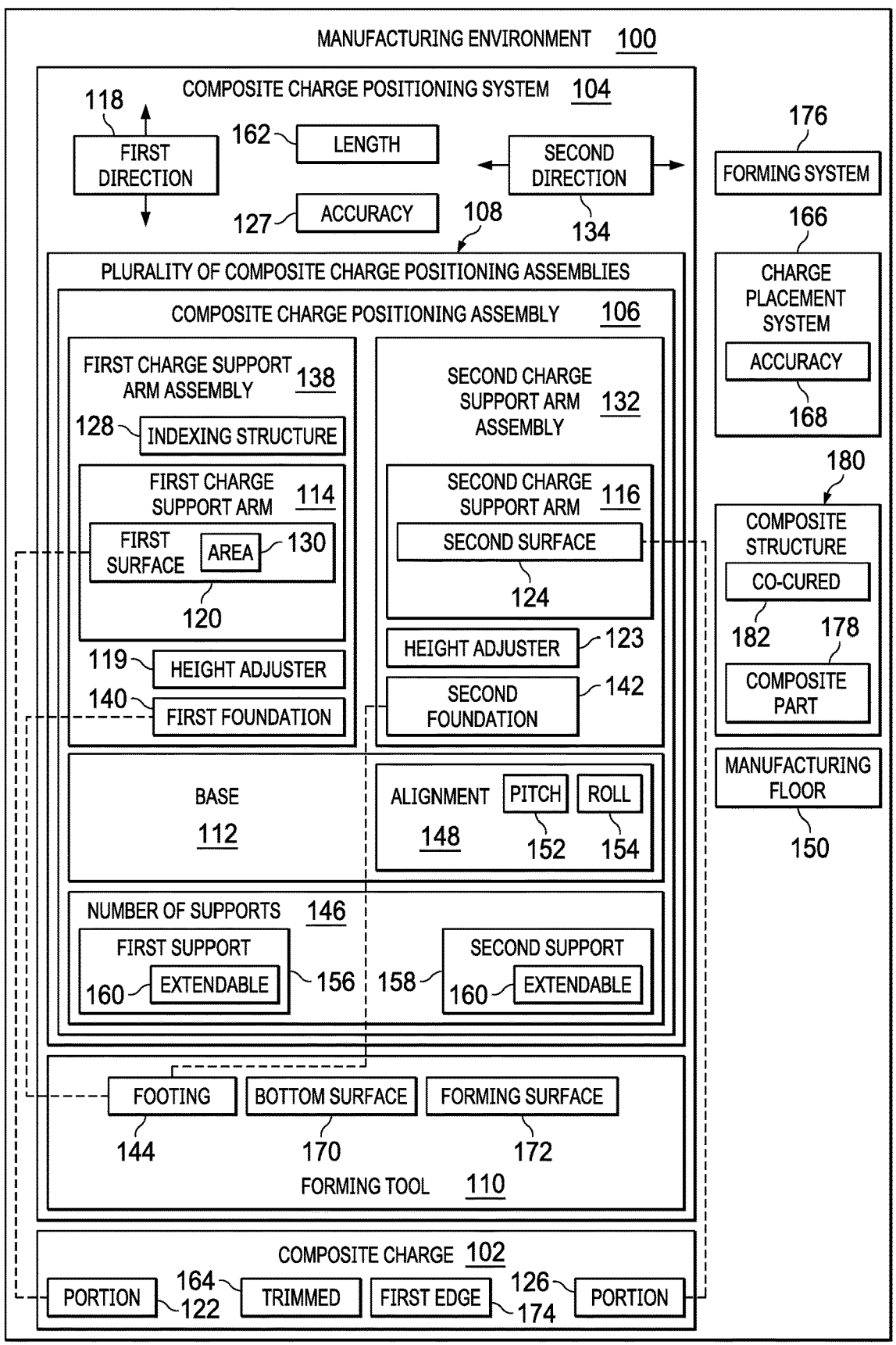
FIG. 1 is an illustration of a block diagram of a manufacturing environment in which a composite charge positioning system operates in accordance with an illustrative example.

Turning now to FIG. 1, an illustration of a block diagram of a manufacturing environment in which a composite charge positioning system operates is depicted in accordance with an illustrative example. Manufacturing environment 100 is an environment in which composite charge 102 is positioned using composite charge positioning system 104. In some illustrative examples, composite charge 102 is laid up in manufacturing environment 100. In some illustrative examples, composite charge 102 is formed to a three-dimensional contour in manufacturing environment 100 after positioning composite charge 102 using composite charge positioning system 104.

Composite charge positioning assembly 106 is one of plurality of composite charge positioning assemblies 108 of composite charge positioning system 104. Composite charge positioning assembly 106 is configured to position composite charge 102 onto forming tool 110. Composite charge positioning assembly 106 comprises base 112, first charge support arm 114, and second charge support arm 116. In some illustrative examples, charge support arms may be referred to as "paddles."

First charge support arm 114 and second charge support arm 116 act as a pair positioned opposite each other. First charge support arm 114 and second charge support arm 116 act together to support composite charge 102. First charge support arm 114 and second charge support arm 116 are positioned on opposite sides of composite charge 102. When forming tool 110 is positioned to receive composite charge 102, first charge support arm 114 and second charge support arm 116 are positioned on either side of forming tool 110. In some illustrative examples, first charge support arm 114 and second charge support arm 116 are described as "facing" each other or facing "inward" towards forming tool 110.

First charge support arm 114 is associated with base 112 and is movable in first direction 118 towards or away from base 112. First charge support arm 114 is movable in first direction 118 using height adjuster 119. Height adjuster 119 takes any desirable form. First charge support arm 114 has first surface 120 configured to contact portion 122 of composite charge 102.

Second charge support arm 116 is associated with base 112 and movable in first direction 118. Second charge support arm 116 is movable in first direction 118 using height adjuster 123. Second charge support arm 116 has second surface 124 configured to contact portion 126 of composite charge 102.

Together, first charge support arm 114 and second charge support arm 116 position composite charge 102 by supporting composite charge 102 on first surface 120 and second surface 124. By placing composite charge 102 in contact with first charge support arm 114 and second charge support arm 116, composite charge 102 is positioned relative to forming tool 110 with accuracy 127.

Composite charge positioning assembly 108 has indexing structure 128. Indexing structure 128 is moveable along first charge support arm 114. Indexing structure 128 provides accurate placement of composite charge 102 onto first charge support arm 114 and second charge support arm 116. By moving indexing structure 128 along first charge support arm 114, the size of area 130 of first surface 120 in contact with portion 122 is adjusted. By moving indexing structure 128 towards second charge support arm 116, area 130 is reduced. By moving indexing structure 128 away from second charge support arm 116, area 130 is increased. Prior to placing composite charge 102 onto first surface 120 of first charge support arm 114, a position of indexing structure 128 relative to first charge support arm 114 is set.

Second charge support arm 116 is a component of second charge support arm assembly 132 movable in second direction 134 across base 112 towards or away from first charge support arm 114. By moving second charge support arm assembly 132 towards first charge support arm 114, a distance between first charge support arm 114 and second charge support arm 116 is reduced.

First charge support arm 114 is part of first charge support arm assembly 138. First charge support arm assembly 138 comprises first foundation 140 associated with base 112. Second charge support arm assembly 132 comprises second foundation 142 moveably associated with base 112. By second foundation 142 being moveably associated with base 112, second charge support arm 116 is moveable towards and away from first charge support arm 114.

In some illustrative examples, first foundation 140 and second foundation 142 are configured to restrain forming tool 110. In some illustrative examples, forming tool 110 has footing 144 configured to be restrained by plurality of composite charge positioning assemblies 108 of composite charge positioning system 104. In these illustrative examples, footing 144 is configured to be restrained by first foundation 140 of first charge support arm assembly 138 and second foundation 142 of second charge support arm assembly 132. In some illustrative examples, footing 144 is configured to be restrained by the first foundation of a respective first charge support arm assembly and the second foundation of a respective second charge support arm assembly of each composite charge positioning assembly of plurality of composite charge positioning assemblies 108.

In these illustrative examples, composite charge positioning assembly 106 locks forming tool 110 between first charge support arm assembly 138 and second charge support arm assembly 132, wherein first charge support arm assembly 138 comprises first charge support arm 114, and wherein second charge support arm assembly 132 comprises second charge support arm 116. In these illustrative examples, first charge support arm assembly 138 and second charge support arm assembly 132 are used to both restrain forming tool 110 and position composite charge 102.

Number of supports 146 is associated with base 112. A "number of" items includes one or more items. For example, number of supports 146 includes one or more supports. Number of supports 146 is configured to adjust alignment 148 of base 112 relative to manufacturing floor 150. Alignment 148 includes at least one of pitch 152 and roll 154 of base 112 relative to manufacturing floor 150. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

In some illustrative examples, number of supports 146 comprises first support 156 and second support 158. To allow for adjustment of alignment 148, each of first support 156 and second support 158 is extendable 160.

Composite charge positioning system 104 is configured to position a composite charge, such as composite charge 102, onto a forming tool, such as forming tool 110. Composite charge positioning system 104 is adjustable to accommodate a variety of shapes and sizes of forming tools. Composite charge positioning system 104 comprises plurality of composite charge positioning assemblies 108 positioned along length 162 of composite charge positioning system 104. Each composite charge positioning assembly of plurality of composite charge positioning assemblies 108 comprises a base; a first charge support arm associated with the base and movable in a first direction towards or away from the base, the first charge support arm having a first surface configured to contact a portion of a composite charge; and a second charge support arm associated with the base and movable in the first direction, and the second charge support arm having a second surface configured to contact a second portion of the composite charge.

In some illustrative examples, composite charge 102 is trimmed 164 to a desired shape prior to curing. In these illustrative examples, composite charge 102 is trimmed 164 to a desired shape prior to placing on forming tool 110. Composite charge positioning system 104 is configured to have accuracy 127 that is desirable for placing trimmed 164 composite charge 102. Composite charge positioning system 104 has accuracy 127 greater than an accuracy of placing composite charge 102 by hand by a number of operators. Composite charge positioning system 104 has accuracy 127 greater than accuracy 168 of charge placement system 166.

Charge placement system 166 is a conventional charge placement system, such as a pick and place system. Charge placement system 166 has accuracy 168 lower than desired for placement of composite charge 102 on forming tool 110.

Composite charge 102 is placed onto first charge support arm 114 and second charge support arm 116 using any desirable method. In some illustrative examples, composite charge 102 is placed onto first charge support arm 114 and second charge support arm 116 by hand. Although composite charge 102 is placed onto composite charge positioning system 104 by hand, using composite charge positioning system 104 to position composite charge 102 onto forming tool 110 increases accuracy of placement of composite charge 102 from the accuracy of hand-laying to accuracy 127 of composite charge positioning system 104.

In some illustrative examples, composite charge 102 is placed onto first charge support arm 114 and second charge support arm 116 using charge placement system 166. Although composite charge 102 is placed onto composite charge positioning system 104 using charge placement system 166, using composite charge positioning system 104 to position composite charge 102 onto forming tool 110 increases accuracy of placement of composite charge 102 from accuracy 168 of charge placement system 166 to accuracy 127 of composite charge positioning system 104.

Composite charge positioning system 104 provides accuracy 127 with a smaller footprint than pick and place systems providing accuracy 127. Composite charge positioning system 104 is flexible and adjustable to accommodate different lengths, sizes, and shapes of forming tools. Composite charge positioning system 104 is flexible and adjustable to accommodate different lengths, sizes, and shapes of composite charges.

Prior to positioning composite charge 102, plurality of composite charge positioning assemblies 108 of composite charge positioning system 104 is prepared to receive forming tool 110. The alignment of each composite charge positioning assembly of plurality of composite charge positioning assemblies 108 is adjusted to receive a respective portion of forming tool 110.

In some illustrative examples, a quantity of composite charge positioning assemblies may be added or removed from plurality of composite charge positioning assemblies 108 to accommodate forming tool 110 and composite charge 102. For example, a quantity of composite charge positioning assemblies can be added to plurality of composite charge positioning assemblies 108 to increase a length of composite charge positioning system 104 to accommodate a longer forming tool. As another example, a quantity of composite charge positioning assemblies can be removed from plurality of composite charge positioning assemblies 108 to decrease a length of composite charge positioning system 104 to accommodate a shorter forming tool.

In some illustrative examples, a spacing between plurality of composite charge positioning assemblies 108 is adjusted to accommodate a type of composite charge 102. Decreasing a spacing between plurality of composite charge positioning assemblies 108 increases support to composite charge 102. Increasing a spacing between plurality of composite charge positioning assemblies 108 decreases support to composite charge 102. The spacing between plurality of composite charge positioning assemblies 108 is adjustable to accommodate different stiffnesses of composite charges caused by at least one of a temperature, a number of plies, a type of composite material, or any other characteristics of the composite charge.

After preparing plurality of composite charge positioning assemblies 108, forming tool 110 is positioned between a first charge arm support arm assembly and a second charge support arm assembly of each of plurality of composite charge positioning assemblies 108. In some illustrative examples, forming tool 110 is referred to as a longitudinal forming tool. Forming tool 110 extends along length 162 of composite charge positioning system 104. In some illustrative examples, forming tool 110 is configured to form a longitudinal composite part, such as a stringer or other type of composite support.

After positioning forming tool 110, forming tool 110 is restrained by plurality of composite charge positioning assemblies 108. In some illustrative examples, footing 144 is restrained by respective foundations of a first charge arm support arm assembly and a second charge support arm assembly of each of plurality of composite charge positioning assemblies 108. Forming tool 110 is restrained relative to plurality of composite charge positioning assemblies 108 such that a desirable accuracy, accuracy 127 can be achieved.

When restrained by plurality of composite charge positioning assemblies 108, bottom surface 170 of forming tool 110 faces base 112 of composite charge positioning assembly 106. When restrained by plurality of composite charge positioning assemblies 108, bottom surface 170 of forming tool 110 faces each respective base of plurality of composite charge positioning assemblies 108. In some illustrative examples, bottom surface 170 contacts base 112 of composite charge positioning assembly 106.

Forming surface 172 of forming tool 110 is opposite bottom surface 170. After forming tool 110 is restrained in composite charge positioning system 104, forming surface 172 faces away from base 112. Forming surface 172 has any desirable shape. Forming surface 172 is configured to impart a desirable contour to composite charge 102. In some illustrative examples, forming surface 172 is configured to form composite charge 102 to have a high contour, which is a contour that matches a final geometry of the engineered part. In some illustrative examples, forming surface 172 is configured to form composite charge 102 into a stringer, such as a hat-shaped stringer, a U-shaped stringer, or any other desirable shape of stringer.

Composite charge 102 is placed onto first charge support arm 114 and second charge support arm 116. Composite charge 102 is placed onto first charge support arm 114 using indexing structure 128. First edge 174 of composite charge 102 is aligned relative to indexing structure 128. By aligning first edge 174 relative to indexing structure 128, composite charge 102 is desirably positioned on first charge support arm 114 and second charge support arm 116.

Composite charge 102 is placed in contact with a portion of forming surface 172. In some illustrative examples, composite charge 102 is placed in contact with the portion of forming surface 172 when composite charge 102 is placed in contact with first charge support arm 114 and second charge support arm 116. In some illustrative examples, composite charge 102 is placed in contact with the portion of forming surface 172 after composite charge 102 is placed in contact with first charge support arm 114 and second charge support arm 116. In these illustrative examples, first charge support arm 114 and second charge support arm 116 are moved in first direction 118 towards base 112. As first charge support arm 114 and second charge support arm 116 are moved in first direction 118 towards base 112, composite charge 102 comes into contact with forming tool 110. In some illustrative examples, after composite charge 102 is in contact with forming tool 110, first charge support arm 114 and second charge support arm 116 are moved in first direction 118 towards base 112 so that first charge support arm 114 and second charge support arm 116 are no longer in contact with composite charge 102.

After composite charge 102 is placed in contact with forming tool 110, composite charge 102 is formed on forming surface 172. To form composite charge 102 on forming surface 172, pressure is applied to composite charge 102. Forming composite charge 102 may also be referred to as forming against forming surface 172 or forming onto forming surface 172. A contour is introduced to composite charge 102 by forming composite charge 102 on forming surface 172.

In some illustrative examples, composite charge 102 is formed onto forming surface 172 while forming tool 110 is in composite charge positioning system 104. In these illustrative examples, charge support arms are moved so that pressure may be applied to composite charge 102 to form composite charge 102 onto forming tool 110.

In other illustrative examples, forming tool 110 with composite charge 102 is removed from within composite charge positioning system 104 and placed into forming system 176. When forming tool 110 is moved to forming system 176, composite charge 102 is held against forming tool 110 in any desirable fashion. In some illustrative examples, the tack of composite charge 102 holds composite charge 102 on forming tool 110. In some illustrative examples, vacuum is applied to composite charge 102 to hold composite charge 102 on forming tool 110 during movement of forming tool 110.

In these illustrative examples, pressure is applied to composite charge 102 by forming system 176. In these illustrative examples, forming system 176 applies pressure to composite charge 102 to form composite charge 102 onto forming surface 172. Forming system 176 takes any desirable form. For example, forming system 176 may apply pressure using pneumatic pressure or mechanical pressure.

After forming composite charge 102 onto forming tool 110, composite charge 102 is cured to form composite part 178. In some illustrative examples, composite part 178 is part of composite structure 180. In some illustrative examples composite part 178 is co-cured with other composite parts to form composite structure 180 that is co-cured 182.

Composite charge positioning system 104 provides accuracy 127 sufficient to place composite charge 102 for co-cured 182 composite structure 180 to achieve a desirable quality of composite structure 180. Composite charge positioning system 104 provides accuracy 127 in placement of composite charge 102 sufficient for desirable quality of composite part 178.

In some illustrative examples, accuracy 127 is greater than accuracy of human operator placement and an accuracy of a light duty pick and place system such as charge placement system 166. In some illustrative examples, accuracy 127 is less than an accuracy of a heavy-duty pick and place system.

Composite charge positioning system 104 is adjustable to accommodate different sizes or shapes of composite charges. In some illustrative examples, composite charge positioning system 104 is moveable within manufacturing environment 100. For example, composite charge positioning system 104 may be moved within manufacturing environment 100 to position composite charge positioning system 104 in a desired location within manufacturing environment 100.

Composite charge positioning system 104 provides a lower investment cost than conventional pick and place systems. A lower investment cost is desirable for all composite charges, but will greatly reduce a per part cost for parts that are created in small quantities or on demand. The adjustability of composite charge positioning system 104 is also desirable for parts that are created in small quantities or on demand.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, more than one forming tool may be present in manufacturing environment 100. Each forming tool has a desirable size and shape of forming surface for an intended composite part. Composite charge positioning system 104 is adjustable to position composite charges on a variety of different sizes and shapes of forming tools, including forming tools with different forming surface shapes and sizes as well as forming tools with different sizes and shapes of footings.

As another example, composite charge positioning system 104 may have a movement system (not depicted) to move composite charge positioning system 104 within manufacturing environment. As yet a further example, forming components, such as pressure application components, (not depicted) may be associated with composite charge positioning system 104 to form composite charge 102 onto forming tool 110.

As yet another example, more than one indexing structure may be present in a composite charge positioning assembly, such as composite charge positioning assembly 106. For example, an indexing structure may be associated with second charge support arm 116. In some of these examples, indexing structures are present on both first charge support arm 114 and second charge support arm 116. In some examples, two indexing structures can work together to index composite charge 102 by indexing structures on each side 'pinching' composite charge 102.

Figure 2:
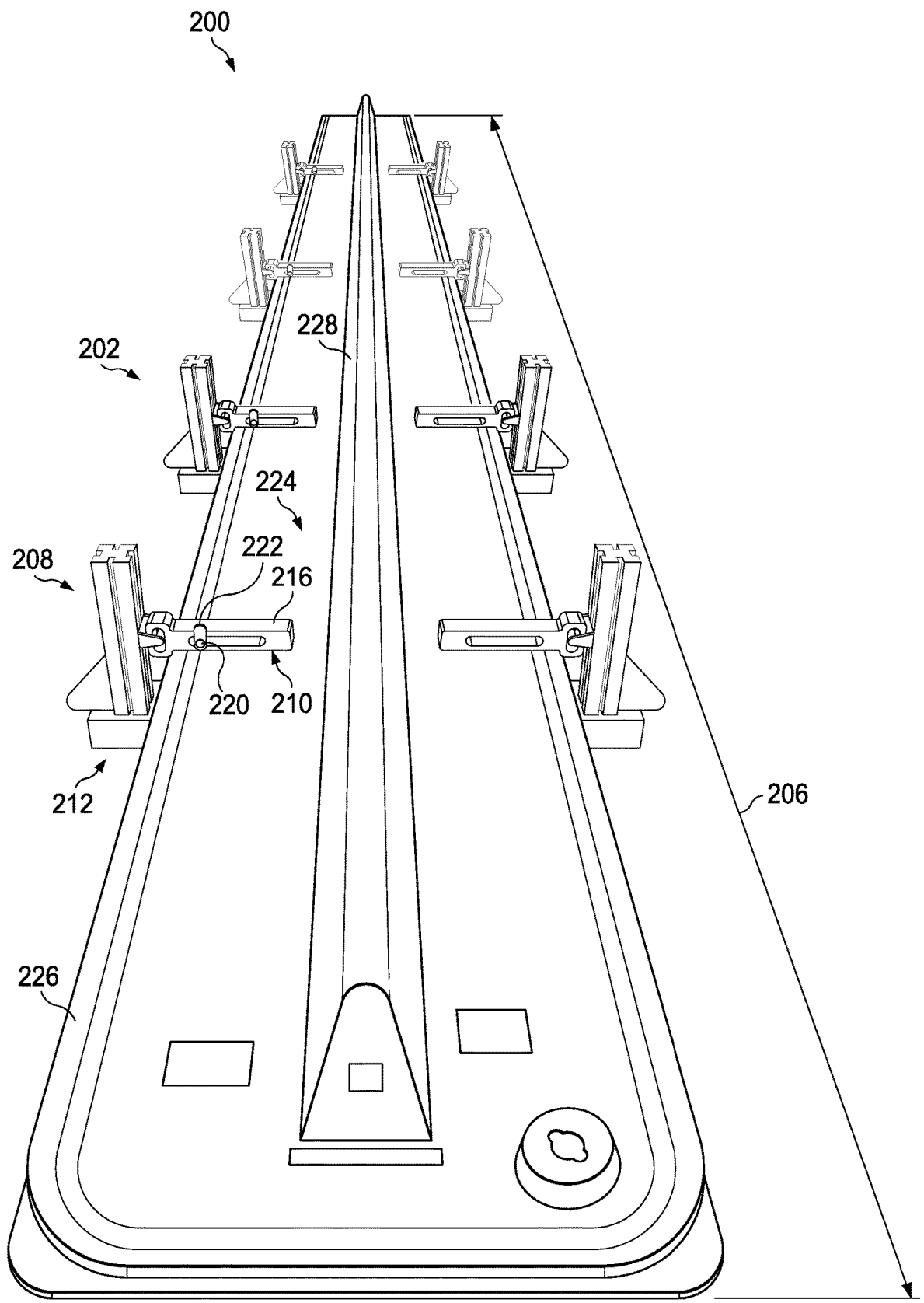
FIG. 2 is a view in a longitudinal direction of a composite charge positioning system in accordance with an illustrative embodiment.

Turning now to FIG. 2, a view in a longitudinal direction of a composite charge positioning system is depicted in accordance with an illustrative embodiment. Composite charge positioning system 200 is a physical implementation of composite charge positioning system 104 of FIG. 1.

Composite charge positioning system 200 comprises plurality of composite charge positioning assemblies 202. Plurality of composite charge positioning assemblies 202 are positioned along length 206 of composite charge positioning system 200. As depicted, plurality of composite charge positioning assemblies 202 includes four composite charge positioning assemblies. Each composite charge positioning assembly of plurality of composite charge positioning assemblies 202 comprises a pair of charge support arms configured to support a composite charge. Each composite charge positioning assembly of plurality of composite charge positioning assemblies 202 comprises a base; a first charge support arm associated with the base and movable in a first direction towards or away from the base, the first charge support arm having a first surface configured to contact a portion of a composite charge; and a second charge support arm associated with the base and movable in the first direction, and the second charge support arm having a second surface configured to contact a second portion of the composite charge.

For example, composite charge positioning assembly 208 has first charge support arm 210 associated with base 212 and second charge support arm 214 associated with base 212. First charge support arm 210 has first surface 216 configured to contact a portion of a composite charge. Second charge support arm 214 has second surface 218 configured to contact a second portion of a composite charge.

Composite charge positioning assembly 208 has indexing structure 220 moveable along first charge support arm 210. Indexing structure 220 may be used to place a composite charge relative to composite charge positioning assembly 208. Although indexing structure 220 is depicted as indexing arm 222, indexing structure 220 may take any desirable form. For example, in some non-depicted examples, indexing structure 220 comprises at least one of a ruler, a colored region, or a series of icons.

As depicted, forming tool 224 is positioned between each pair of charge support arms. For example, forming tool 224 is positioned between first charge support arm 210 and second charge support arm 214. Forming tool 224 extends along length 206 of composite charge positioning system 200.

Forming tool 224 is held in place by plurality of composite charge positioning assemblies 202. Forming tool 224 is held in place between first charge support arm assemblies and second charge support arm assemblies of plurality of composite charge positioning assemblies 202.

Forming tool 224 has footing 226 and forming surface 228. Footing 226 is secured between a first charge support arm assembly and a second charge support arm assembly of each composite charge positioning assembly of plurality of composite charge positioning assemblies 202. Forming surface 228 is configured to receive a composite charge (not depicted).

Forming tool 224 is configured to form a composite charge (not depicted) into a complex contour. As depicted, forming tool 224 is configured to form a composite stringer having a U shape.

Figure 3:
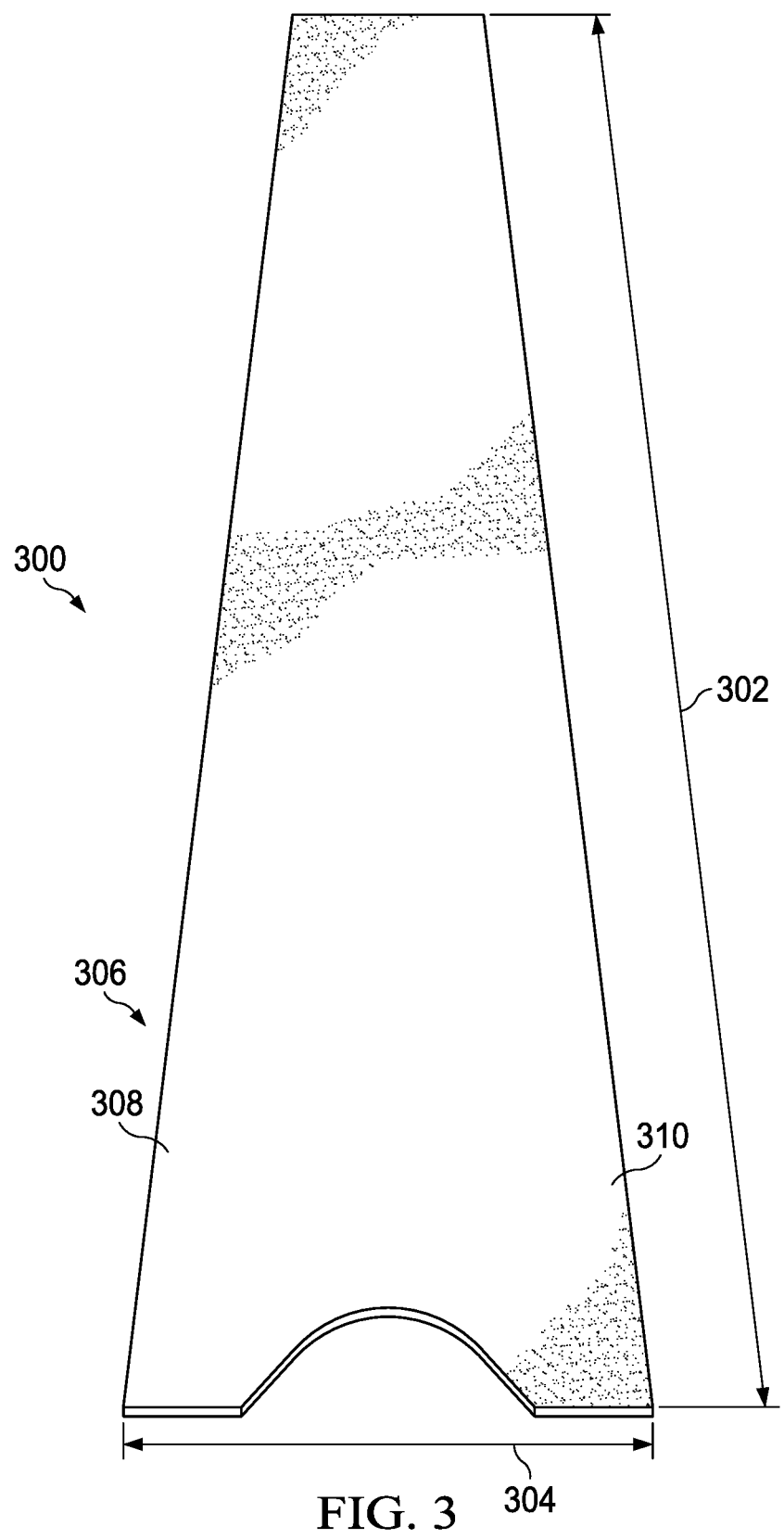
FIG. 3 is a view in a longitudinal direction of a composite charge to be placed by a composite charge positioning system in accordance with an illustrative embodiment.

Turning now to FIG. 3, a view in a longitudinal direction of a composite charge to be placed by a composite charge positioning system is depicted in accordance with an illustrative embodiment. Composite charge 300 is a physical implementation of composite charge 102 of FIG. 1. Composite charge 300 is a physical implementation of a composite charge that may be positioned using composite charge positioning system 200 of FIG. 2.

Composite charge 300 has length 302 and width 304. Composite charge 300 may be referred to as a longitudinal charge. Composite charge 300 is an uncured charge.

Composite charge 300 is trimmed 306. Composite charge 300 has a desired shape prior to curing due to being trimmed 306.

Composite charge 300 has side 308 and side 310. Side 308 is opposite side 310 along width 304. Either of side 308 or side 310 can be positioned against a number of indexing structures of a composite charge positioning system.

Figure 4:
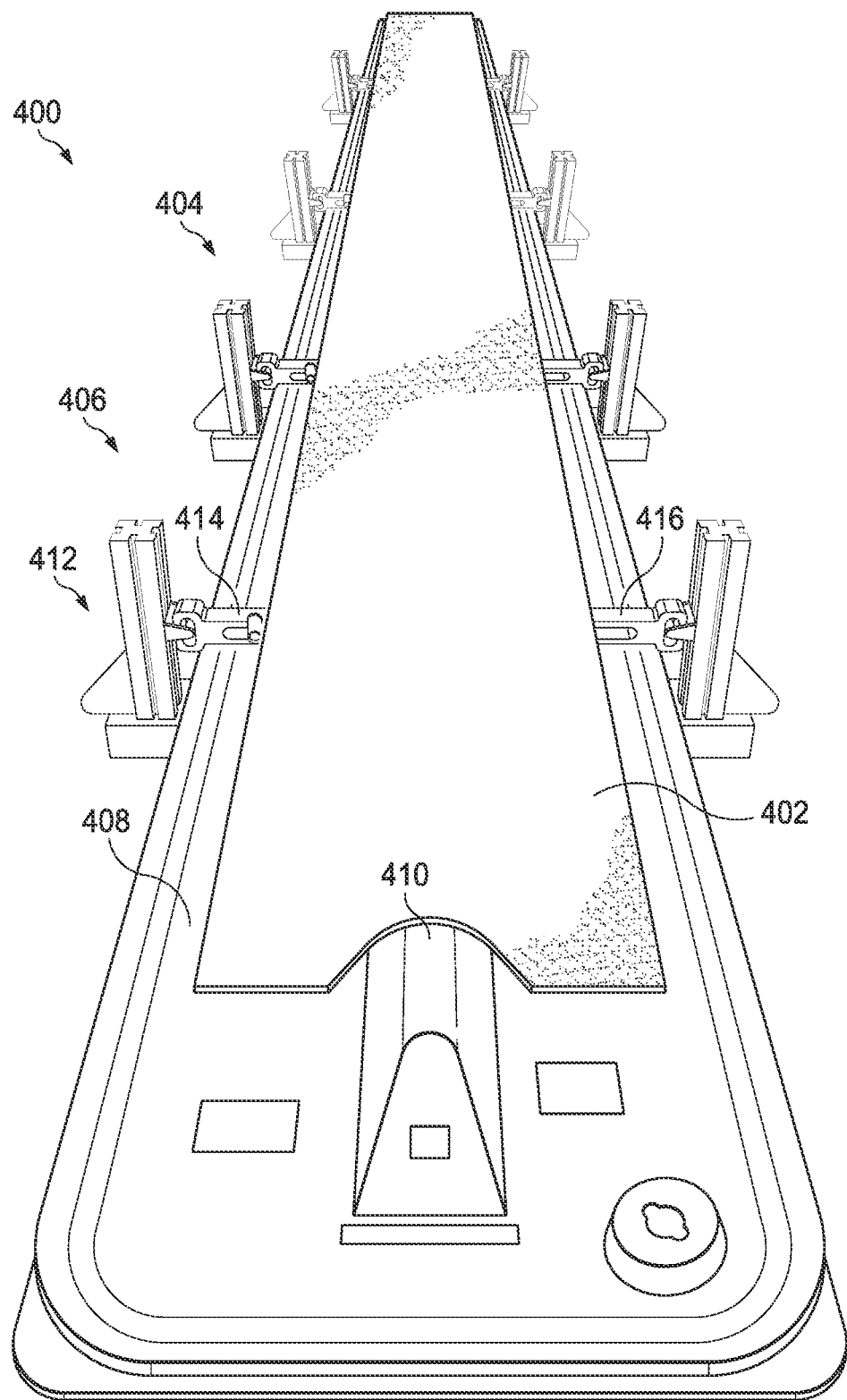
FIG. 4 is a view in a longitudinal direction of a composite charge on a composite charge positioning system in accordance with an illustrative embodiment.

Turning now to FIG. 4, a view in a longitudinal direction of a composite charge on a composite charge positioning system is depicted in accordance with an illustrative embodiment. In view 400, composite charge 402 is placed on composite charge positioning system 404. Composite charge 402 is a physical implementation of composite charge 102 of FIG. 1. Composite charge 402 is a physical implementation of a composite charge that may be positioned using composite charge positioning system 200 of FIG. 2. In some illustrative examples, composite charge 402 is the same as composite charge 300 of FIG. 3.

Composite charge positioning system 404 is a physical implementation of composite charge positioning system 104 of FIG. 1. In some illustrative examples, composite charge positioning system 404 is the same as composite charge positioning system 200 of FIG. 2.

In view 400, composite charge 402 is supported by plurality of composite charge positioning assemblies 406. Plurality of composite charge positioning assemblies 406 is positioned along the length of composite charge positioning system 404. As depicted, plurality of composite charge positioning assemblies 406 includes four composite charge positioning assemblies.

Each composite charge positioning assembly of plurality of composite charge positioning assemblies 406 has a pair charge support arms configured to support composite charge 402. Each pair of charge support arms has a first charge support arm and a second charge support arm on opposite sides of composite charge 402 and in contact with a bottom surface of composite charge 402.

For example, composite charge positioning assembly 412 of plurality of composite charge positioning assemblies 406 has first charge support arm 414 and second charge support arm 416 in contact with composite charge 402. Each of first charge support arm 414 and second charge support arm 416 support a respective portion of composite charge 402.

In view 400, composite charge 402 is in contact with the charge support arms of plurality of composite charge positioning assemblies 406 and forming tool 408. Forming tool 408 is a physical implementation of forming tool 110 of FIG. 1. In some illustrative examples, forming tool 408 is the same as forming tool 224 of FIG. 2. Composite charge 402 is in contact with a portion of forming surface 410 of forming tool 408. After view 400, the charge support arms of plurality of composite charge positioning assemblies 406 are moved out of contact with composite charge 402, and composite charge 402 is formed against forming surface 410.

In view 400, composite charge 402 appears rigid. View 400 is only a non-limiting example. Depending upon the material of composite charge 402, the temperature of the manufacturing environment, and the quantity of plies in composite charge 402, composite charge 402 the flexibility of composite charge 402 is variable. At least one of a quantity of composite charge positioning assemblies in plurality of composite charge positioning assemblies 406 or a surface area of the charge support arms may be increased or decreased to provide a desired support based on the flexibility of composite charge 402.

Turning now to FIGS. 5-10, a front view of a composite charge positioning assembly in a composite charge positioning system is depicted in a series of alignments. FIGS. 5-10 are non-limiting examples of implementations of a composite charge positioning assembly and a forming tool. In some examples, the composite charge positioning assembly may move through FIGS. 5-10 in sequence. In other illustrative examples, each of FIGS. 5-10 may be implemented independently.

Figure 5:
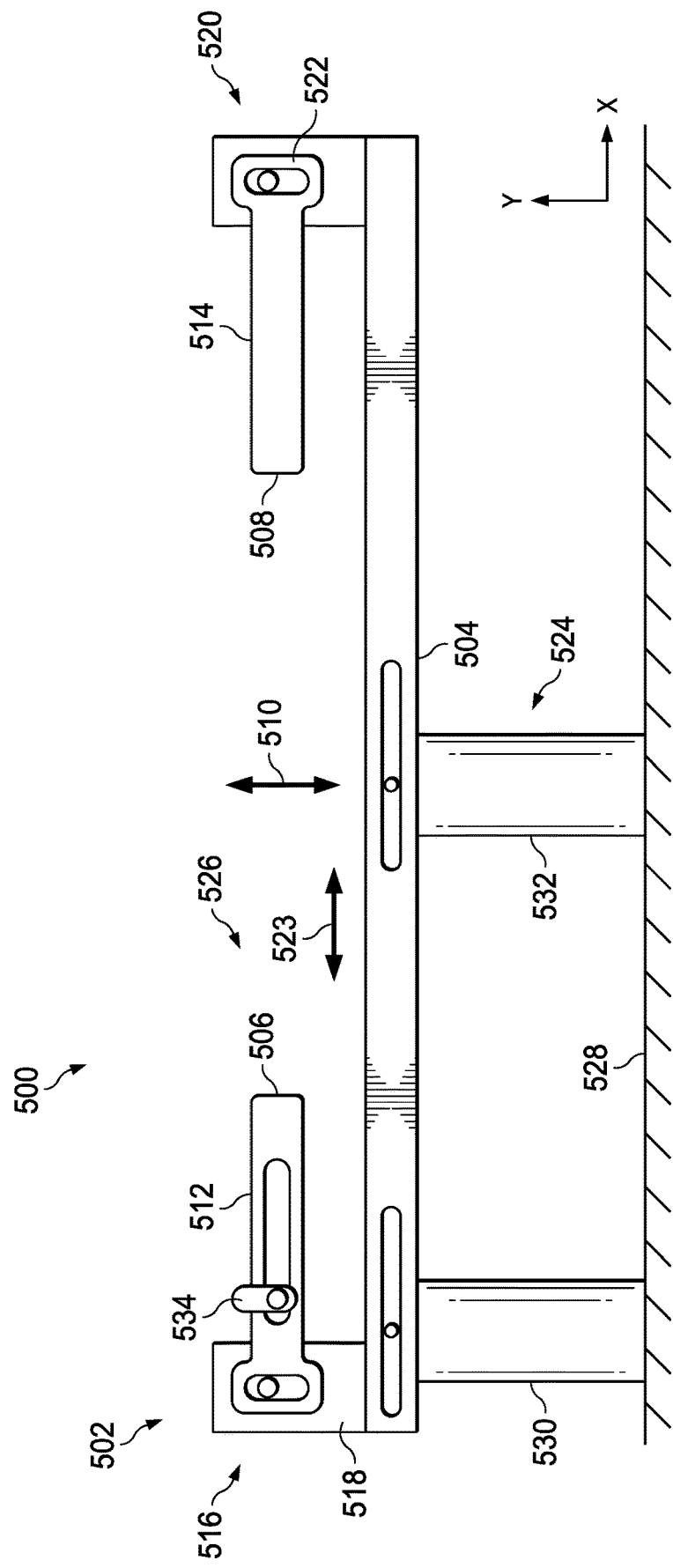
FIG. 5 is a front view of a composite charge positioning assembly in a composite charge positioning system in accordance with an illustrative embodiment.

Turning now to FIG. 5, a front view of a composite charge positioning assembly in a composite charge positioning system is depicted in accordance with an illustrative embodiment. View 500 is a front view of composite charge positioning assembly 502. Composite charge positioning assembly 502 is a physical implementation of composite charge positioning assembly 106 of FIG. 1. Composite charge positioning assembly 502 may be one of plurality of composite charge positioning assemblies 202 of FIG. 2. Composite charge positioning assembly 502 may be used to position composite charge 300 of FIG. 3. Composite charge positioning assembly 502 may be a composite charge positioning assembly of composite charge positioning system 404 of FIG. 4.

Composite charge positioning assembly 502 comprises base 504, first charge support arm 506 associated with base 504, and second charge support arm 508 associated with base 504. First charge support arm 506 is moveable in first direction 510 towards or away from base 504. First charge support arm 506 has first surface 512 configured to contact a portion of a composite charge (not depicted).

Second charge support arm 508 is movable in first direction 510. Second charge support arm 508 has second surface 514 configured to contact a second portion of the composite charge.

First charge support arm 506 and second charge support arm 508 act as a pair positioned opposite each other. In some illustrative examples, first charge support arm 506 and second charge support arm 508 are referred to as a pair of support arms. First charge support arm 506 and second charge support arm 508 act together to support a composite charge when composite charge positioning assembly 502 is used to position the composite charge. First charge support arm 506 and second charge support arm 508 are positioned on opposite sides of the composite charge.

First charge support arm 506 is part of first charge support arm assembly 516. First charge support arm assembly 516 further comprises first foundation 518 associated with base 504.

Second charge support arm 508 is part of second charge support arm assembly 520. Second charge support arm assembly 520 further comprises second foundation 522 moveably associated with base 504. Second charge support arm 508 is a component of second charge support arm assembly 520 movable in second direction 523 across base 504 towards or away from first charge support arm 506. In some illustrative examples, first foundation 518 and second foundation 522 are configured to restrain a forming tool.

As depicted, number of supports 524 is associated with base 504. Number of supports 524 is configured to adjust alignment 526 of base 504 relative to manufacturing floor 528. As depicted in FIG. 5, base 504 is substantially parallel to manufacturing floor 528. Alignment 526 includes pitch and roll of base 504 relative to manufacturing floor 528.

At least one of pitch or roll of base 504 is adjusted by adjusting the height of number of supports 524. As depicted, number of supports 524 includes first support 530 and second support 532. First support 530 and second support 532 are both extendable to adjust the height of a respective support of first support 530 and second support 532. By adjusting the height of either of first support 530 or second support 532, alignment 526 of base 504 is adjusted.

As depicted, composite charge positioning assembly 502 further comprises indexing structure 534 moveable along first charge support arm 506. Indexing structure 534 is adjusted to change an area of first surface 512. Moving indexing structure 534 towards second charge support arm 508 decreases the area of first surface 512 while moving indexing structure 534 away from second charge support arm 508 increases the area of first surface 512 to receive a portion of a composite charge.

Figure 6:
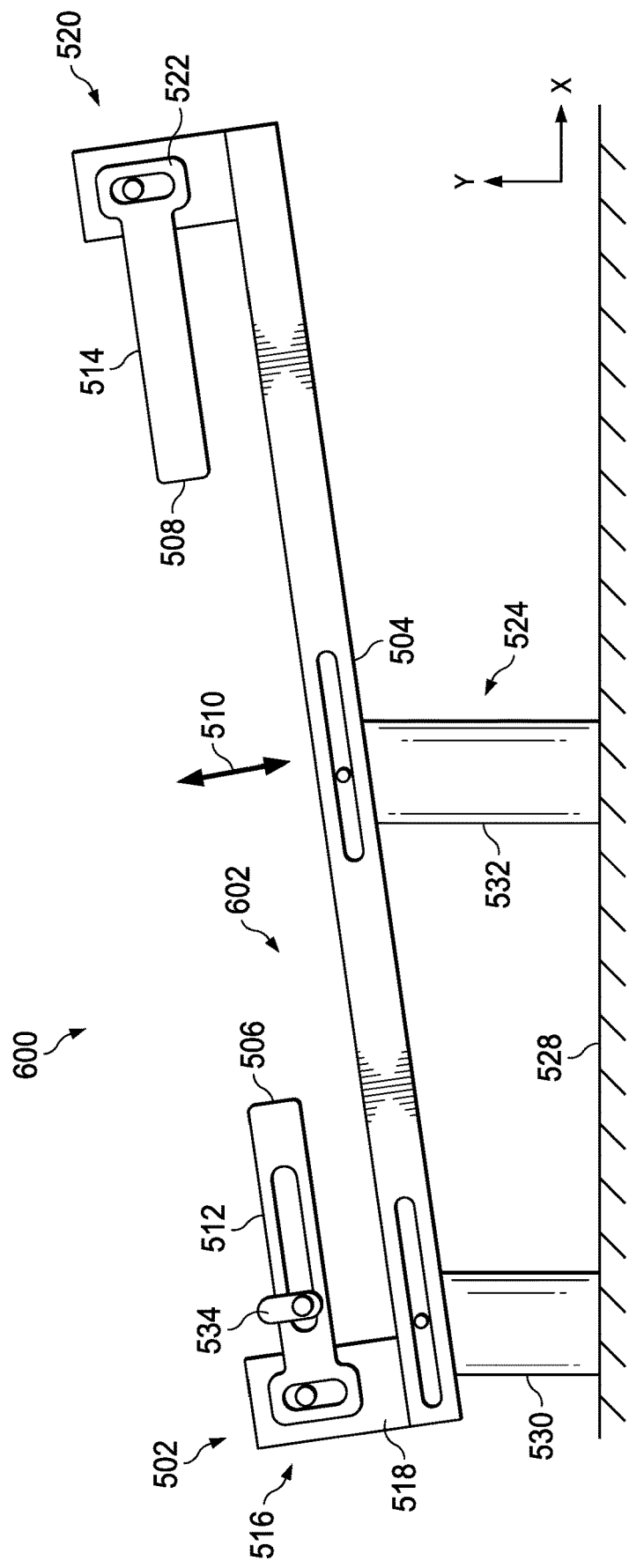
FIG. 6 is a front view of a composite charge positioning assembly in a composite charge positioning system in accordance with an illustrative embodiment.

Turning now to FIG. 6, a front view of a composite charge positioning assembly in a composite charge positioning system is depicted in accordance with an illustrative embodiment. In view 600, alignment 602 of composite charge positioning assembly 502 relative to manufacturing floor 528 is different from alignment 526 of composite charge positioning assembly 502 in view 500.

In view 600, second support 532 has been extended from view 500. In view 600, alignment 602 is at an angle approximately 20 degrees from manufacturing floor 528.

In some illustrative examples, a forming tool has varying curvature along the length of the forming tool. In some illustrative examples, to accommodate the shape of the forming tool along its length, each base of a plurality of composite charge positioning assemblies of a composite charge positioning system is independently aligned relative to manufacturing floor 528. In these illustrative examples, each base of a plurality of composite charge positioning assemblies is independently aligned to support the forming tool. For example, in view 600, composite charge positioning assembly 502 has alignment 602. Alignment 602 is set to support a forming tool. In some illustrative examples, to achieve the pitch and roll of a forming tool, at least two bases in a composite charge positioning system have different alignments relative to manufacturing floor 528.

Figure 7:
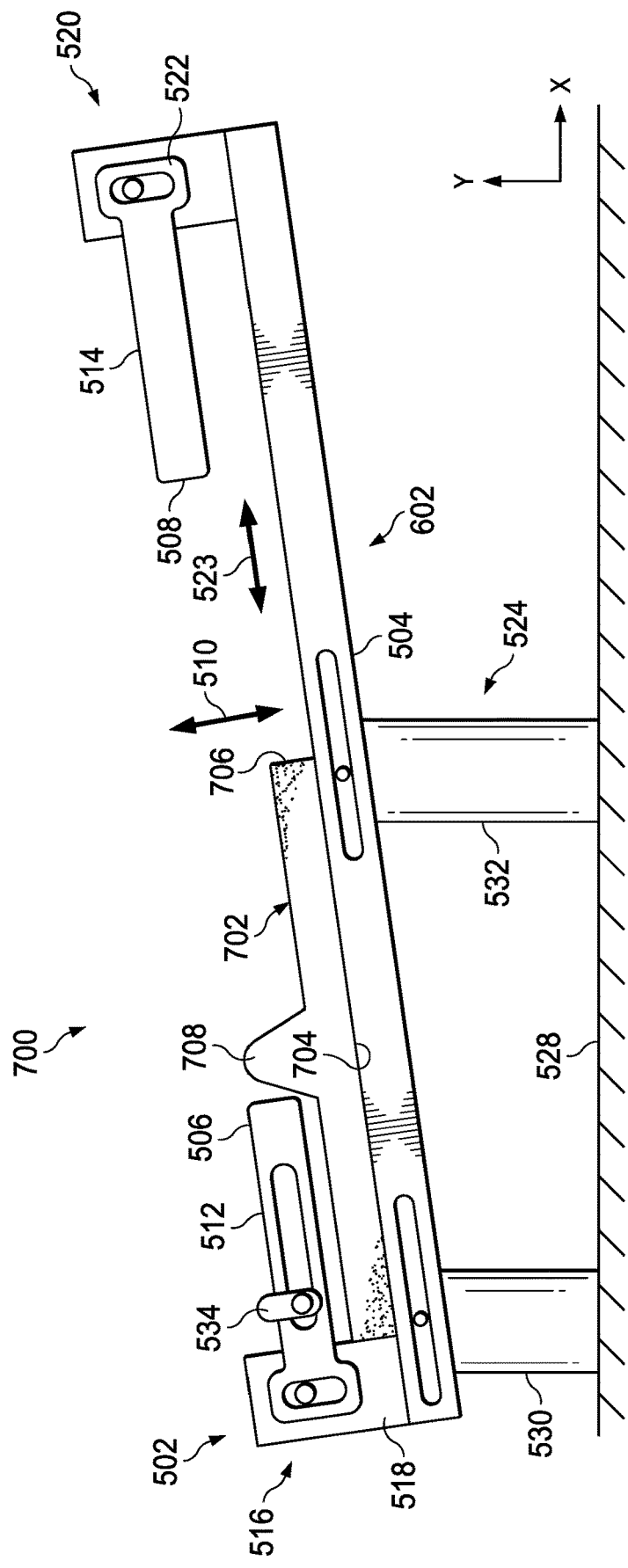
FIG. 7 is a front view of a composite charge positioning assembly and a forming tool in a composite charge positioning system in accordance with an illustrative embodiment.

Turning now to FIG. 7, a front view of a composite charge positioning assembly and a forming tool in a composite charge positioning system is depicted in accordance with an illustrative embodiment. In view 700, forming tool 702 has been placed onto base 504 of composite charge positioning assembly 502. In view 700, bottom surface 704 of forming tool 702 faces base 504 of composite charge positioning assembly 502. As depicted, bottom surface 704 is in contact with base 504.

As depicted, alignment 602 of base 504 is set to support bottom surface 704 of forming tool 702. View 700 is a cross-sectional view of only a portion of bottom surface 704 of forming tool 702. Other portions of bottom surface 704 along the length of forming tool 702 (not depicted in view 700) may have a different angle relative to manufacturing floor 528. Portions of bottom surface 704 into or out of the page in view 700 may be supported by bases set at at least one different alignment than alignment 602 of base 504.

Forming tool 702 has footing 706 and forming surface 708. Footing 706 is configured to restrain forming tool 702. Forming surface 708 is a surface opposite bottom surface 704. Forming surface 708 is configured to receive a composite charge. Forming surface 708 is configured to impart a desired contour to the composite charge when the composite charge is formed on forming surface 708.

Figure 8:
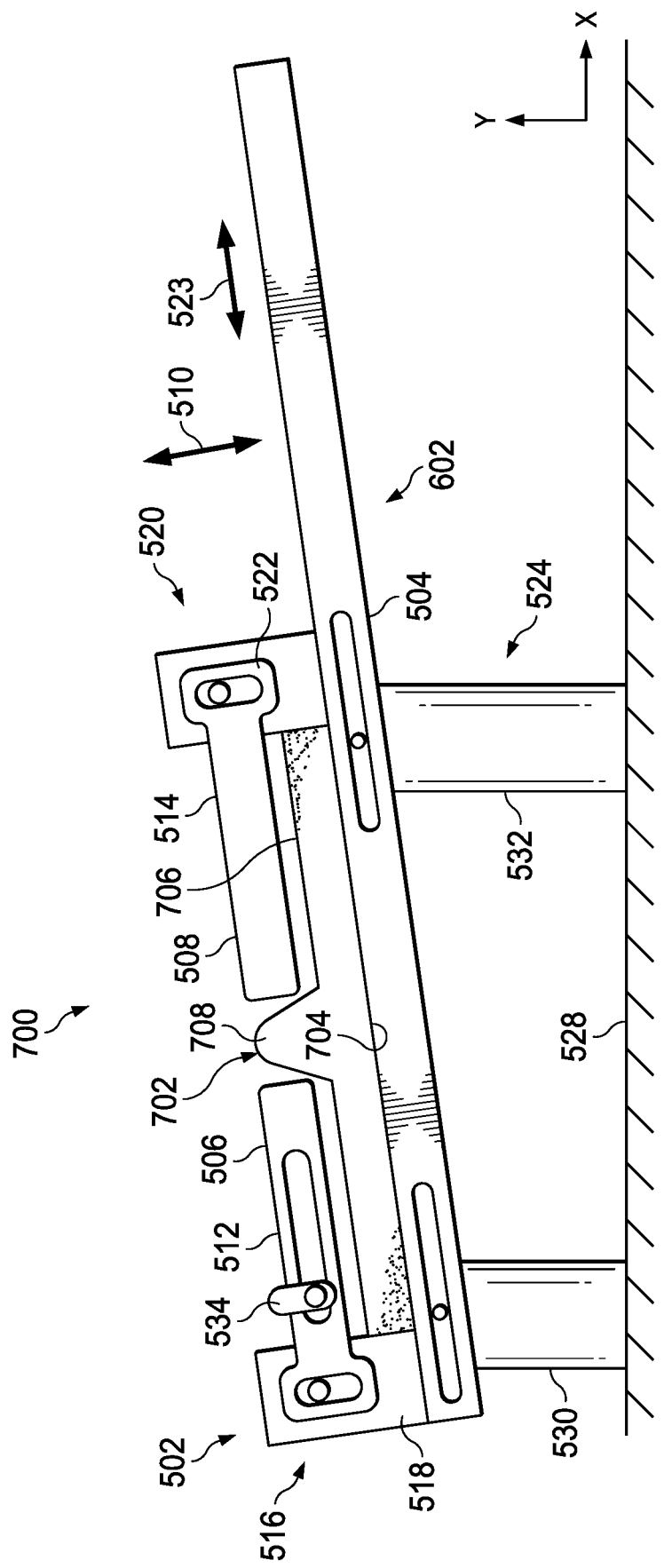
FIG. 8 is a front view of a composite charge positioning assembly and a forming tool in a composite charge positioning system in accordance with an illustrative embodiment.

Turning now to FIG. 8, a front view of a composite charge positioning assembly and a forming tool in a composite charge positioning system is depicted in accordance with an illustrative embodiment. In view 800, second charge support arm assembly 520 moved in second direction 523 across base 504 towards first charge support arm 506 from view 700. Second foundation 522 was moved relative to base 504 between view 700 and view 800.

In view 800, first foundation 518 and second foundation 522 are in contact with footing 706. In view 800, first foundation 518 and second foundation 522 restrain forming tool 702 from movement in second direction 523.

Figure 9:
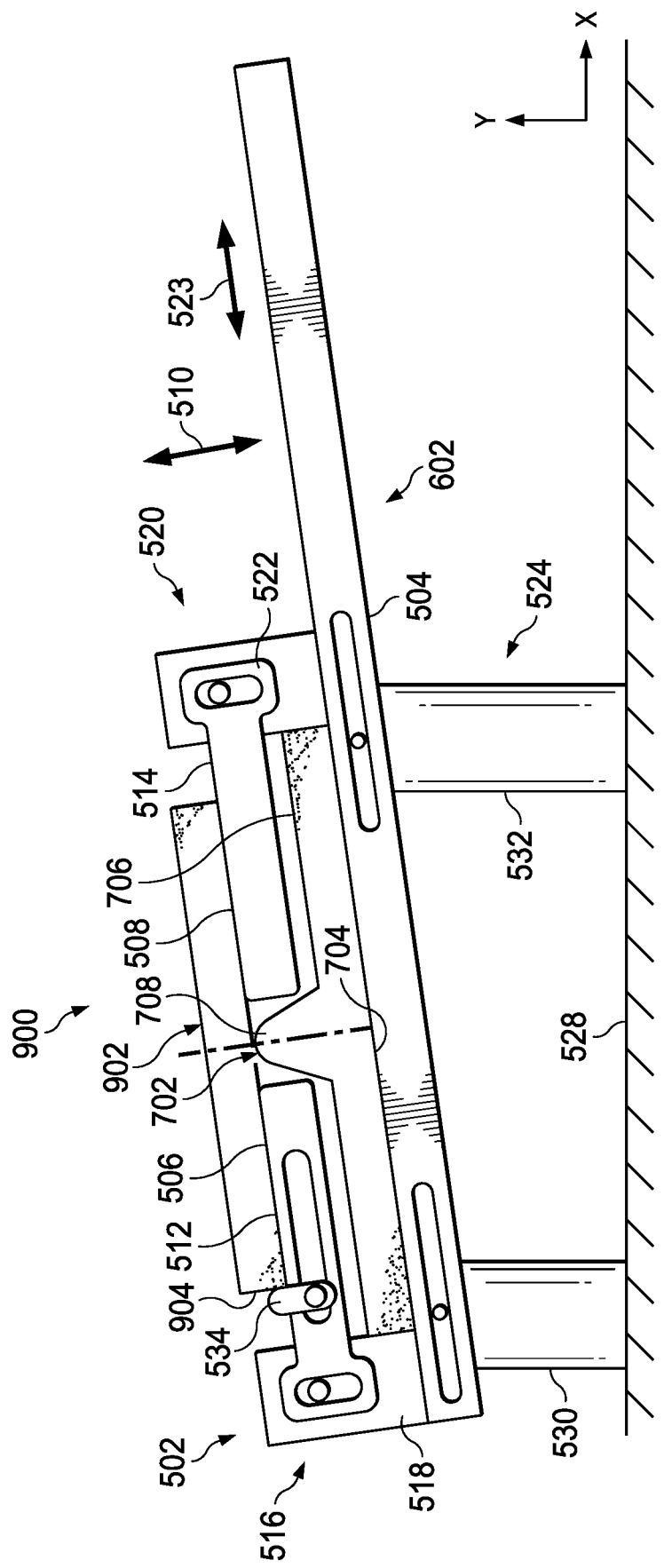
FIG. 9 is a front view of a composite charge on a composite charge positioning system in accordance with an illustrative embodiment.

Turning now to FIG. 9, a front view of a composite charge on a composite charge positioning system is depicted in accordance with an illustrative embodiment. In view 900, composite charge 902 has been placed in contact with first surface 512 of first charge support arm 506 and second surface 514 of second charge support arm 508. In view 900, first side 904 of composite charge 902 is in contact with indexing structure 534. Indexing structure 534 is used to index composite charge 902 onto composite charge positioning assembly 502.

In view 900, composite charge 902 is in contact with a portion of forming surface 708 of forming tool 702. In view 900, composite charge 902 is centered on forming tool 702.

Figure 10:
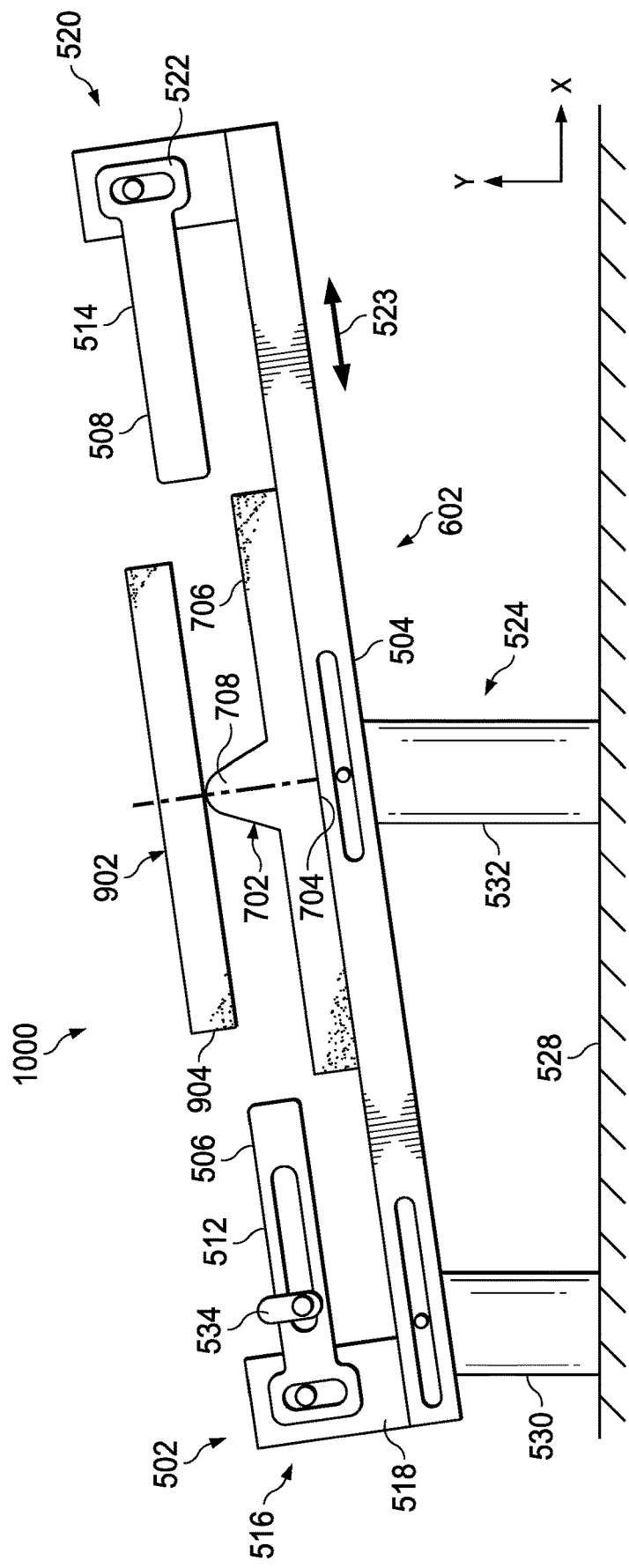
FIG. 10 is a front view of a composite charge on a forming tool in a composite charge positioning system in accordance with an illustrative embodiment.

Turning now to FIG. 10, a front view of a composite charge on a forming tool in a composite charge positioning system is depicted in accordance with an illustrative embodiment. In view 1000, composite charge 902 is in contact with a portion of forming tool 702. Between view 900 and view 1000, first charge support arm 506 and second charge support arm 508 have been moved in first direction 510 towards base 504. Between view 900 and view 1000, second charge support arm 508 has been moved in second direction 523 away from first charge support arm 506. By moving second foundation 522 away from first foundation 518, forming tool 702 is released. In view 1000, forming tool 702 is moveable relative to base 504.

In some illustrative examples, forming tool 702 with composite charge 902 on forming surface 708 is removed from composite charge positioning assembly 502 following view 1000. In some illustrative examples, forming tool 702 with composite charge 902 is placed onto a forming system. In these illustrative examples, the forming system applies pressure to composite charge 902 to form composite charge 902 on forming surface 708.

In view 1000, composite charge 902 appears rigid. View 1000 is only a non-limiting example. Depending upon the material of composite charge 902, the temperature of the manufacturing environment, and the quantity of plies in composite charge 902, composite charge 902 the flexibility of composite charge 902 is variable.

When forming tool 702 is moved to a forming system, composite charge 902 is held on forming tool 702 in any desirable fashion. In some illustrative examples, the tack of composite charge 902 holds composite charge 902 on forming tool 702. In some illustrative examples, vacuum is applied to composite charge 902 to hold composite charge 902 on forming tool 702 during movement of forming tool 702.

In other illustrative examples, forming tool 702 may remain on base 504 while a forming system applies pressure to composite charge 902 to form composite charge 902 on forming tool 702. By applying pressure to composite charge 902 while forming tool 702 remains on base 504, a movement step may be eliminated. By applying pressure to composite charge 902 to form composite charge 902 while forming tool 702 remains on base 504, manufacturing time may be reduced.

Figure 11:
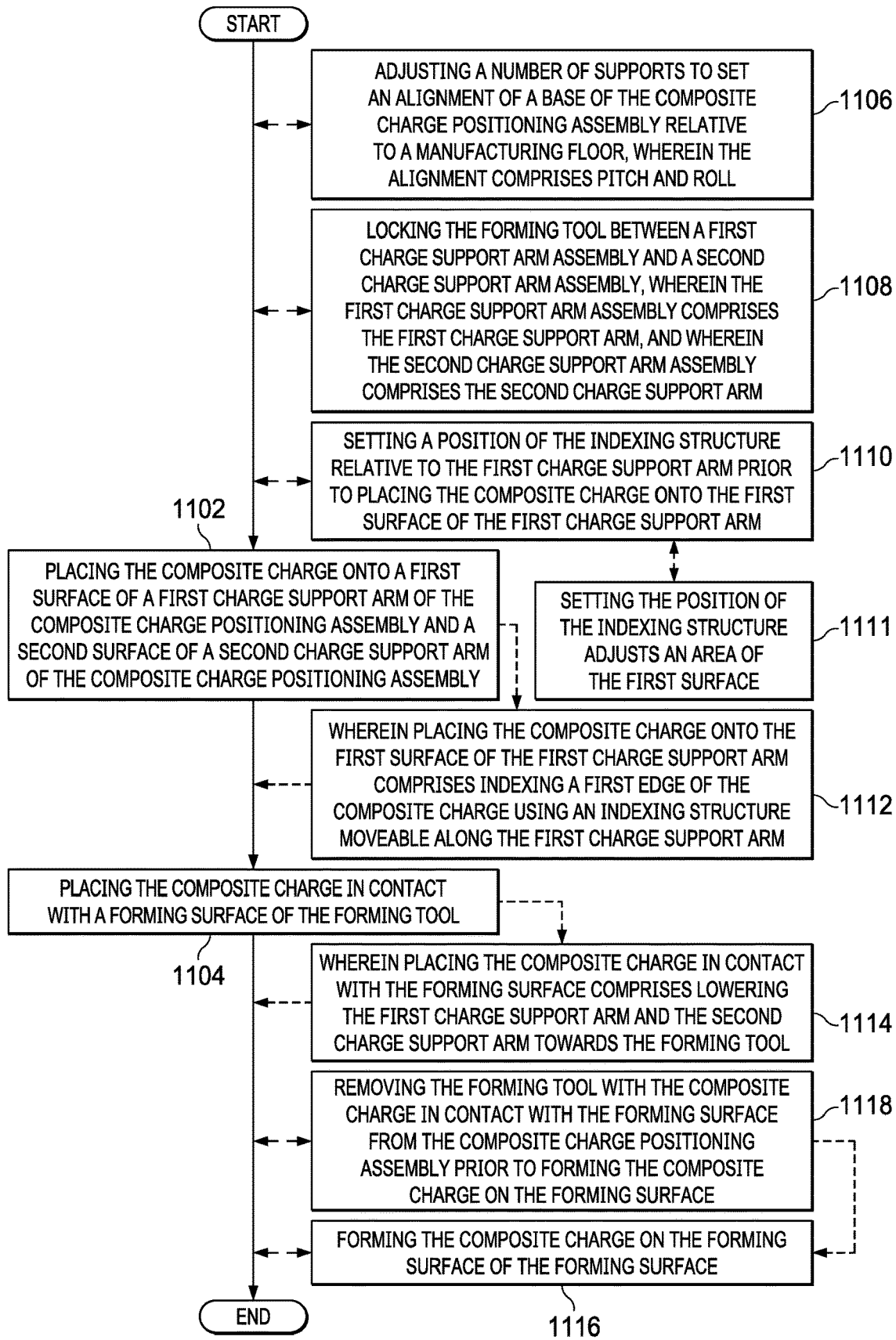
FIG. 11 is an illustration of a flowchart of a method of positioning a composite charge onto a forming tool using a composite charge positioning assembly in accordance with an illustrative example.

Turning now to FIG. 11, an illustration of a flowchart of a method of positioning a composite charge onto a forming tool using a composite charge positioning assembly is depicted in accordance with an illustrative example. Method 1100 can be implemented in manufacturing environment 100 of FIG. 1 to position composite charge 102 onto forming tool 110 using composite charge positioning assembly 106. Method 1100 can be implemented using composite charge positioning assembly 208 of FIG. 2. Method 1100 can be used to position composite charge 300 of FIG. 3. Method 1100 can be used by composite charge positioning assembly 412 of FIG. 4 to position composite charge 402. Method 1100 can be implemented using composite charge positioning assembly 502 of FIGS. 5-10.

Method 1100 is a method of positioning a composite charge onto a forming tool using a composite charge positioning assembly. Method 1100 places the composite charge onto a first surface of a first charge support arm of the composite charge positioning assembly and a second surface of a second charge support arm of the composite charge positioning assembly (operation 1102). Method 1100 places the composite charge in contact with a portion of a forming surface of the forming tool (operation 1104). Afterwards, the method terminates.

In some illustrative examples, method 1100 adjusts a number of supports to set an alignment of a base of the composite charge positioning assembly relative to a manufacturing floor, wherein the alignment comprises pitch and roll (operation 1106). In some illustrative examples, the composite charge positioning assembly is one of a plurality of composite charge positioning assemblies in a composite charge positioning system. In some illustrative examples, different composite charge positioning assemblies of the composite charge positioning system will have different alignments relative to the manufacturing floor.

In some illustrative examples, method 1100 locks the forming tool between a first charge support arm assembly and a second charge support arm assembly, wherein the first charge support arm assembly comprises the first charge support arm, and wherein the second charge support arm assembly comprises the second charge support arm (operation 1108). In some illustrative examples, a footing of the forming tool is secured by a first foundation of the first charge support arm assembly and a second foundation of the second charge support arm assembly.

In some illustrative examples, method 1100 sets a position of an indexing structure relative to the first charge support arm prior to placing the composite charge onto the first surface of the first charge support arm (operation 1110). In some illustrative examples, setting the position of the indexing structure adjusts an area of the first surface (operation 1111).

In some illustrative examples, placing the composite charge onto the first surface of the first charge support arm comprises indexing a first edge of the composite charge using an indexing structure moveable along the first charge support arm (operation 1112). The indexing structure takes any desirable form. For example, the indexing structure may take the form of at least one of an arm, a peg, a ruler, a colored region, or a series of icons.

Operations 1102 and 1104 occur in any desirable order. In some illustrative examples, operations 1102 and 1104 may occur substantially simultaneously. In some illustrative examples, the composite charge is placed in contact with the portion of the forming surface of the forming tool as the composite charge is placed onto the first surface of the first charge support arm and the second surface of the second charge support arm. In some other illustrative examples, operations 1102 and 1104 may occur in sequence. In some illustrative examples, the composite charge is placed in contact with the portion of the forming surface of the forming tool as the first charge support arm and second charge support arm are moved in a first direction towards the forming tool.

In some illustrative examples, placing the composite charge in contact with the forming surface comprises lowering the first charge support arm and the second charge support arm towards the forming tool (operation 1114). In some illustrative examples, method 1100 forms the composite charge onto the forming surface of the forming tool (operation 1116). In some illustrative examples, the composite charge is formed onto the forming surface of the forming tool while the forming tool is positioned within the composite charge positioning system. In some illustrative examples, the composite charge is formed on the forming surface of the forming tool while the forming tool is positioned between the first charge support arm and the second charge support arm of the composite charge positioning assembly. In these illustrative examples, the charge support arms are moved so that pressure may be applied to the composite charge. In these illustrative examples, the charge support arms of the composite charge positioning assembly are no longer in contact with the composite charge when the pressure is applied to the composite charge.

In some illustrative examples, method 1100 removes the forming tool with the composite charge in contact with the forming surface from the composite charge positioning assembly prior to forming the composite charge on the forming surface (operation 1118). In some of these illustrative examples, the forming tool is removed from the composite charge positioning assembly and placed in a forming system. In these illustrative examples, the forming system is used to apply pressure to the composite charge to form the composite charge on the forming tool.

In some illustrative examples, the tack of the composite charge maintains a position of the composite charge in contact with the portion of the forming surface of the forming tool. In some illustrative examples, vacuum is applied to the composite charge to maintain a position of the composite charge in contact with the portion of the forming surface of the forming tool.

The flowcharts and block diagrams in the different depicted examples illustrate the architecture, functionality, and operation of some possible implementations of apparatus and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. In some illustrative examples, not all blocks of method 1100 are performed. For example, operations 1106 through 1118 of FIG. 11 are optional.

Figure 12:
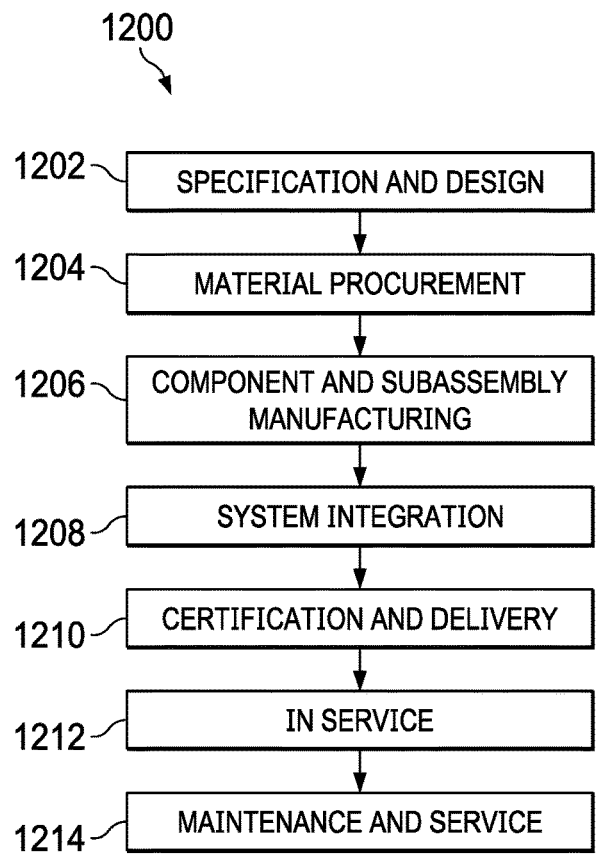
FIG. 12 is an illustration of an aircraft manufacturing and service method in a form of a block diagram in accordance with an illustrative embodiment.
Figure 13:
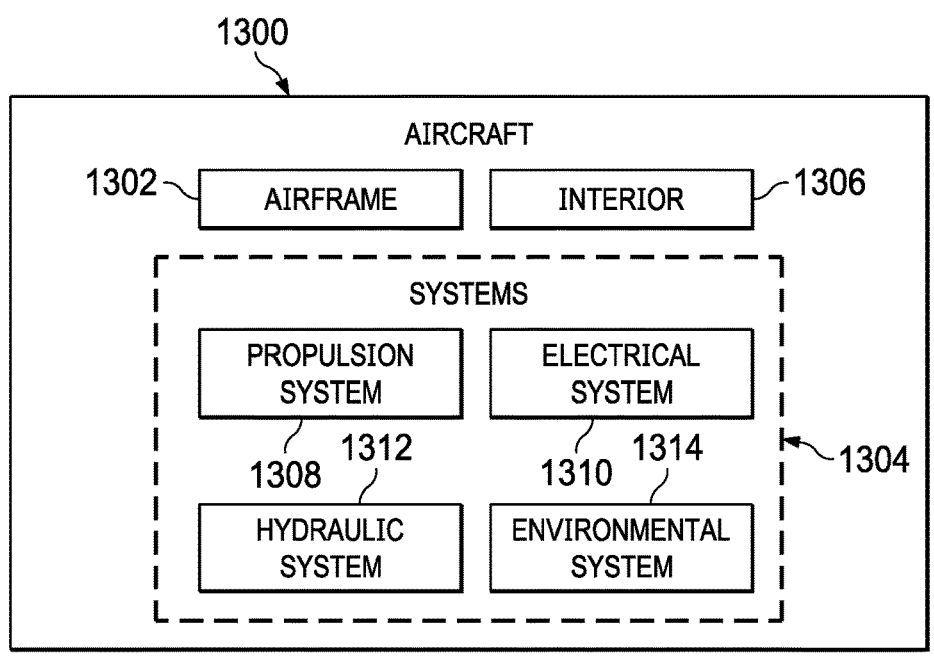
FIG. 13 is an illustration of an aircraft in a form of a block diagram in which an illustrative embodiment may be implemented.

The illustrative examples of the present disclosure may be described in the context of aircraft manufacturing and service method 1200 as shown in FIG. 12 and aircraft 1300 as shown in FIG. 13. Turning first to FIG. 12, an illustration of an aircraft manufacturing and service method is depicted in accordance with an illustrative example. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 takes place. Thereafter, aircraft 1300 may go through certification and delivery 1210 in order to be placed in service 1212. While in service 1212 by a customer, aircraft 1300 is scheduled for maintenance and service 1214, which may include modification, reconfiguration, refurbishment, and other maintenance or service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 13, an illustration of an aircraft is depicted in which an illustrative example may be implemented. In this example, aircraft 1300 is produced by aircraft manufacturing and service method 1200 in FIG. 12 and may include airframe 1302 with a plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 1200. One or more illustrative examples may be used during component and subassembly manufacturing 1206, system integration 1208, or maintenance and service 1214 of FIG. 12. For example, composite charge 102 may be positioned on forming tool 110 and used to form composite part 178 during component and subassembly manufacturing 1206. As another example, composite part 178 formed from composite charge 102 placed by composite charge positioning system 104 may be installed within aircraft 1300 during component and subassembly manufacturing 1206. As another example, composite part 178 formed by placing composite charge 102 may be a replacement part installed during maintenance and service 1214 of FIG. 12.

The illustrative examples provide a composite charge positioning system capable of accurately transferring a net trim charge to a contoured forming tool for high contour forming. The illustrative examples allow a charge made on a layup surface to be formed on a separate forming tool, using a forming system to apply pressure to the charge on the forming tool. The forming system forms the composite charge on the forming tool using any desirable pressure, such as pneumatic pressure or mechanical pressure.

Conventionally, high contour stringers have been fabricated by hand: forming ply by ply and trimmed on a high contour trim jig after forming. Hand forming the high contour stringers is an undesirably expensive and undesirably slow manufacturing process. Using a hand forming method may also use at least one of an undesirably large amount of labor, or use undesirably complicated or undesirably expensive machinery for trimming. Conventional automated forming technology may undesirably form wrinkles or other inconsistencies during creation of a high contour stringer or other high contour composite structure.

The illustrative examples present an accurate indexing/locating feature to index a composite charge centerline based on the composite charge flange length. The illustrative examples provide an apparatus and method of use for alignment of an elongated net trimmed composite charge to a forming tool. The apparatus includes a plurality of adjustable support arms that accurately aligns composite charge periphery relative to the forming tool. In some illustrative examples, the plurality of adjustable support arms first position a geometry-specific forming tool on a tool surface prior to aligning the composite charge relative to the forming tool. Orientation, height, and width of support arms can be adjusted to compensate for longitudinal contour in the forming tool.

The illustrative examples can be used for the fabrication of hat (or other configurations) stringers for use on onto composite skins to make integrally stiffened structures. In these illustrative examples, stringer charges are laminated and trimmed to their final periphery profile (net trim) prior to forming. Most often a charge is aligned to a mandrel based on its centerline, which is not suitable for these types of elongated net trim parts, where alignment of periphery features is more important.

This concept provides for alignment of charges with forming tools without using undesirably expensive fixturing or undesirably complex part transfer. A pick and place device can be used to get the charge close to position and the composite charge positioning system completes the alignment process.

In some illustrative examples, setting stringer width and height on the charge support arms can be manual or actuated. In some illustrative examples, the stringer width and height on the charge support arms can be controlled based on a digital model of stringer geometry.

In some illustrative examples, one side of the number of support arm pairs are moved out of position to allow a stringer forming tool to be placed onto the alignment fixture comprising at least one composite charge positioning assembly. Once the forming tool is restrained in the alignment fixture, the composite charge is positioned above support arms at correct alignment relative to the forming tool.

The illustrative examples present an apparatus and method for aligning a stringer to a forming tool for subsequent processing at a forming machine. The illustrative examples enable the successful transfer of any elongated uncured composite charge without the need for expensive handling equipment, by ensuring alignment of the features of the as-build mandrel to the as-build charge.

An apparatus and method of use for alignment of an elongated net trimmed composite charge to a forming tool are presented, the apparatus comprising a plurality of adjustable support arms that first positions a geometry-specific forming tool on a tool surface and then accurately aligns a composite charge periphery relative to forming tool. Orientation, height, and width of support arms can be adjusted to compensate for longitudinal contour in the forming tool.

An illustrative embodiment of the present disclosure provides a composite charge positioning assembly configured to position a composite charge onto a forming tool. The composite charge positioning assembly comprises a base; a first charge support arm associated with the base and movable in a first direction towards or away from the base; and a second charge support arm associated with the base and movable in the first direction. The first charge support arm has a first surface configured to contact a portion of a composite charge. The second charge support arm has a second surface configured to contact a second portion of the composite charge.

Another illustrative embodiment of the present disclosure provides a composite charge positioning system configured to position a composite charge onto a forming tool. The composite charge positioning system comprises a plurality of composite charge positioning assemblies positioned along a length of the composite charge positioning system, each composite charge positioning assembly of the plurality of composite charge positioning assemblies comprising a base; a first charge support arm associated with the base and movable in a first direction towards or away from the base; and a second charge support arm associated with the base and movable in the first direction. Each first charge support arm having a first surface configured to contact a portion of a composite charge. Each second charge support arm having a second surface configured to contact a second portion of the composite charge.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of positioning a composite charge onto a forming tool using a composite charge positioning assembly, the method comprising steps of:
    placing the composite charge onto a first surface of a first charge support arm of the composite charge positioning assembly and a second surface of a second charge support arm of the composite charge positioning assembly;
    placing the composite charge in contact with a portion of a forming surface of the forming tool; and
    locking the forming tool between a first charge support arm assembly and a second charge support arm assembly, wherein the first charge support arm assembly comprises the first charge support arm, and wherein the second charge support arm assembly comprises the second charge support arm,
    wherein the first charge support arm assembly and the second charge support arm assembly are used to both restrain the forming tool and position the composite charge,
    wherein the step of placing the composite charge onto the first surface of the first charge support arm comprises indexing a first edge of the composite charge using an indexing structure, moveable along the first charge support arm.

2. A method of positioning a composite charge onto a forming tool using a composite charge positioning assembly, the method comprising steps of:
    placing the composite charge onto a first surface of a first charge support arm of the composite charge positioning assembly and a second surface of a second charge support arm of the composite charge positioning assembly; and
    placing the composite charge in contact with a portion of a forming surface of the forming tool,
    wherein the step of placing the composite charge onto the first surface of the first charge support arm comprises indexing a first edge of the composite charge using an indexing structure, moveable along the first charge support arm.

3. The method of claim 1, further comprising a step of setting a position of the indexing structure relative to the first charge support arm prior to the step of placing the composite charge onto the first surface of the first charge support arm.

4. The method of claim 3, wherein the step of setting the position of the indexing structure relative to the first charge support arm adjusts an area of the first surface.

5. A method of positioning a composite charge onto a forming tool using a composite charge positioning assembly, the method comprising steps of:
    placing the composite charge onto a first surface of a first charge support arm of the composite charge positioning assembly and a second surface of a second charge support arm of the composite charge positioning assembly;
    placing the composite charge in contact with a portion of a forming surface of the forming tool; and
    adjusting a number of supports to set an alignment of a base of the composite charge positioning assembly relative to a manufacturing floor, wherein the alignment comprises pitch and roll.

6. The method of claim 1, further comprising a step of forming the composite charge on the forming surface of the forming tool.

7. A method of positioning a composite charge onto a forming tool using a composite charge positioning assembly, the method comprising steps of:
    placing the composite charge onto a first surface of a first charge support arm of the composite charge positioning assembly and a second surface of a second charge support arm of the composite charge positioning assembly;

placing the composite charge in contact with a portion of a forming surface of the forming tool;
forming the composite charge on the forming surface of the forming tool; and
removing the forming tool, with the composite charge in contact with the forming surface, from the composite charge positioning assembly prior to the step of forming the composite charge on the forming surface of the forming tool.

8. The method of claim 1, wherein the step of placing the composite charge in contact with the portion of the forming surface of the forming tool comprises lowering the first charge support arm and the second charge support arm toward the forming tool.

9. The method of claim 1, wherein the step of placing the composite charge onto the first surface of the first charge support arm of the composite charge positioning assembly and the second surface of the second charge support arm of the composite charge positioning assembly also places the composite charge in contact with the portion of the forming surface of the forming tool.

10. A method of positioning a composite charge onto a forming tool using a composite charge positioning assembly, the method comprising:
positioning a first charge support arm of the composite charge positioning assembly relative to a forming surface of the forming tool;
positioning a second charge support arm of the composite charge positioning assembly relative to the forming surface of the forming tool;
placing the composite charge onto a first surface of the first charge support arm of the composite charge positioning assembly and a second surface of the second charge support arm of the composite charge positioning assembly;
lowering the first charge support arm and the second charge support arm toward the forming tool so that the composite charge is placed in contact with a portion of a forming surface of the forming tool;
locking the forming tool between a first charge support arm assembly and a second charge support arm assembly, wherein the first charge support arm assembly comprises the first charge support arm, and wherein the second charge support arm assembly comprises the second charge support arm, wherein the first charge support arm assembly and the second charge support arm assembly are used to both restrain the forming tool and position the composite charge; and
adjusting a number of supports to set an alignment of a base of the composite charge positioning assembly relative to a manufacturing floor, wherein the alignment comprises pitch and roll.

11. A method of positioning a composite charge onto a forming tool using a composite charge positioning assembly, the method comprising:
positioning a first charge support arm of the composite charge positioning assembly relative to a forming surface of the forming tool;
positioning a second charge support arm of the composite charge positioning assembly relative to the forming surface of the forming tool;
placing the composite charge onto a first surface of the first charge support arm of the composite charge positioning assembly and a second surface of the second charge support arm of the composite charge positioning assembly; and
lowering the first charge support arm and the second charge support arm toward the forming tool so that the composite charge is placed in contact with a portion of a forming surface of the forming tool,
further comprising a step of locking the forming tool between a first charge support arm assembly and a second charge support arm assembly, wherein the first charge support arm assembly comprises the first charge support arm, and wherein the second charge support arm assembly comprises the second charge support arm,
wherein the step of locking the forming tool between the first charge support arm assembly and the second charge support arm assembly comprises moving the second charge support arm assembly along a base of the composite charge positioning system such that a footing of the forming tool is restrained by the first charge support arm assembly and the second charge support arm assembly.

12. The method of claim 10, further comprising a step of setting a position of an indexing structure relative to the first charge support arm prior to placing the composite charge onto the first surface of the first charge support arm, wherein the step of setting the position of the indexing structure relative to the first charge support arm adjusts an area of the first surface.

13. A method of positioning a composite charge onto a forming tool using a composite charge positioning assembly, the method comprising steps of:
moving the forming tool to the composite charge positioning assembly;
placing the forming tool between a first charge support arm assembly and a second charge support arm assembly of the composite charge positioning assembly;
locking the forming tool between the first charge support arm assembly and the second charge support arm assembly;
placing the composite charge onto a first surface of a first charge support arm of the first charge support arm assembly and a second surface of a second charge support arm of the second charge support arm assembly;
placing the composite charge in contact with a portion of a forming surface of the forming tool, wherein the first charge support arm assembly and the second charge support arm assembly are used to both restrain the forming tool and position the composite charge; and
removing the forming tool, with the composite charge in contact with the forming surface, from the composite charge positioning assembly; and
forming the composite charge on the forming surface of the forming tool after the step of removing the forming tool from the composite charge positioning assembly.

14. The method of claim 13, wherein the step of placing the composite charge onto the first surface of the first charge support arm of the first charge support arm assembly and the second surface of the second charge support arm of the second charge support arm assembly also places the composite charge in contact with the portion of the forming surface of the forming tool.

15. The method of claim 13, wherein the step of placing the composite charge in contact with the portion of the forming surface of the forming tool comprises lowering the first charge support arm and the second charge support arm towards the forming tool.

16. A method of positioning a composite charge onto a forming tool using a composite charge positioning assembly, the method comprising steps of:
- moving the forming tool to the composite charge positioning assembly;
- placing the forming tool between a first charge support arm assembly and a second charge support arm assembly of the composite charge positioning assembly;
- locking the forming tool between the first charge support arm assembly and the second charge support arm assembly;
- placing the composite charge onto a first surface of a first charge support arm of the first charge support arm assembly and a second surface of a second charge support arm of the second charge support arm assembly; and
- placing the composite charge in contact with a portion of a forming surface of the forming tool,
- wherein the step of locking the forming tool between the first charge support arm assembly and the second charge support arm assembly comprises moving the second charge support arm assembly along a base of the composite charge positioning system such that a footing of the forming tool is restrained by first charge support arm assembly and the second charge support arm assembly.

17. The method of claim 13, further comprising a step of setting a position of an indexing structure relative to the first charge support arm prior to the step of placing the composite charge onto the first surface of the first charge support arm, wherein the step of setting the position of the indexing structure relative to the first charge support arm adjusts an area of the first surface.

18. The method of claim 1, further comprising steps of:
- removing the forming tool, with the composite charge in contact with the forming surface, from the composite charge positioning assembly; and
- forming the composite charge on the forming surface of the forming tool after the step of removing the forming tool from the composite charge positioning assembly.

19. The method of claim 10, wherein the step of placing the composite charge onto the first surface of the first charge support arm comprises indexing a first edge of the composite charge using an indexing structure, moveable along the first charge support arm.

20. The method of claim 13, further comprising adjusting a number of supports to set an alignment of a base of the composite charge positioning assembly relative to a manufacturing floor, wherein the alignment comprises pitch and roll.

* * * * *